United States Patent [19]

de Jager

[11] 4,204,163
[45] May 20, 1980

[54] MINIMUM GROUP PULSE CODE MODEM HAVING SHAPE AND AMPLITUDE CODES

[75] Inventor: Frank de Jager, Eindhoven, Netherlands

[73] Assignee: U.S. Philips Corporation, New York, N.Y.

[21] Appl. No.: 917,494

[22] Filed: Jun. 21, 1978

[30] Foreign Application Priority Data

Jul. 6, 1977 [NL] Netherlands ............... 7707475

[51] Int. Cl.² ............................................. H03K 13/22
[52] U.S. Cl. ..................................... 375/25; 332/11 D
[58] Field of Search ........................... 325/38 R, 38 B; 179/15.55 R, 15 AP, 15 BW, 15 AV; 358/133, 135, 138, 260; 332/11 D; 178/68

[56] References Cited

U.S. PATENT DOCUMENTS

| 3,414,677 | 12/1968 | Quinlan | 179/15.55 |
| 3,705,359 | 12/1972 | Kappes | 329/104 |

Primary Examiner—Robert L. Griffin
Assistant Examiner—Peter Durigon
Attorney, Agent, or Firm—Thomas A. Briody; William J. Streeter; Edward W. Goodman

[57] ABSTRACT

A transmission system which on the transmission side comprises a pulse-code modulation device, which is adapted for the pulse code conversion of consecutive minimum groups of two signal, elements of the information signal, the pulse code modulation device comprises a shape encoder, which in each group interval, encodes by a pulse code a normalized-amplitude shape of the signal variation of the two signal elements, and furthermore comprises an amplitude encoder, which in each group interval, encodes an associated amplitude value by a pulse code. The receiver comprises a multiplier stage for multiplication of the normalized-amplitude shape, which is transmitted in pulse code, in each group interval, by the associated amplitude value.

1 Claim, 14 Drawing Figures

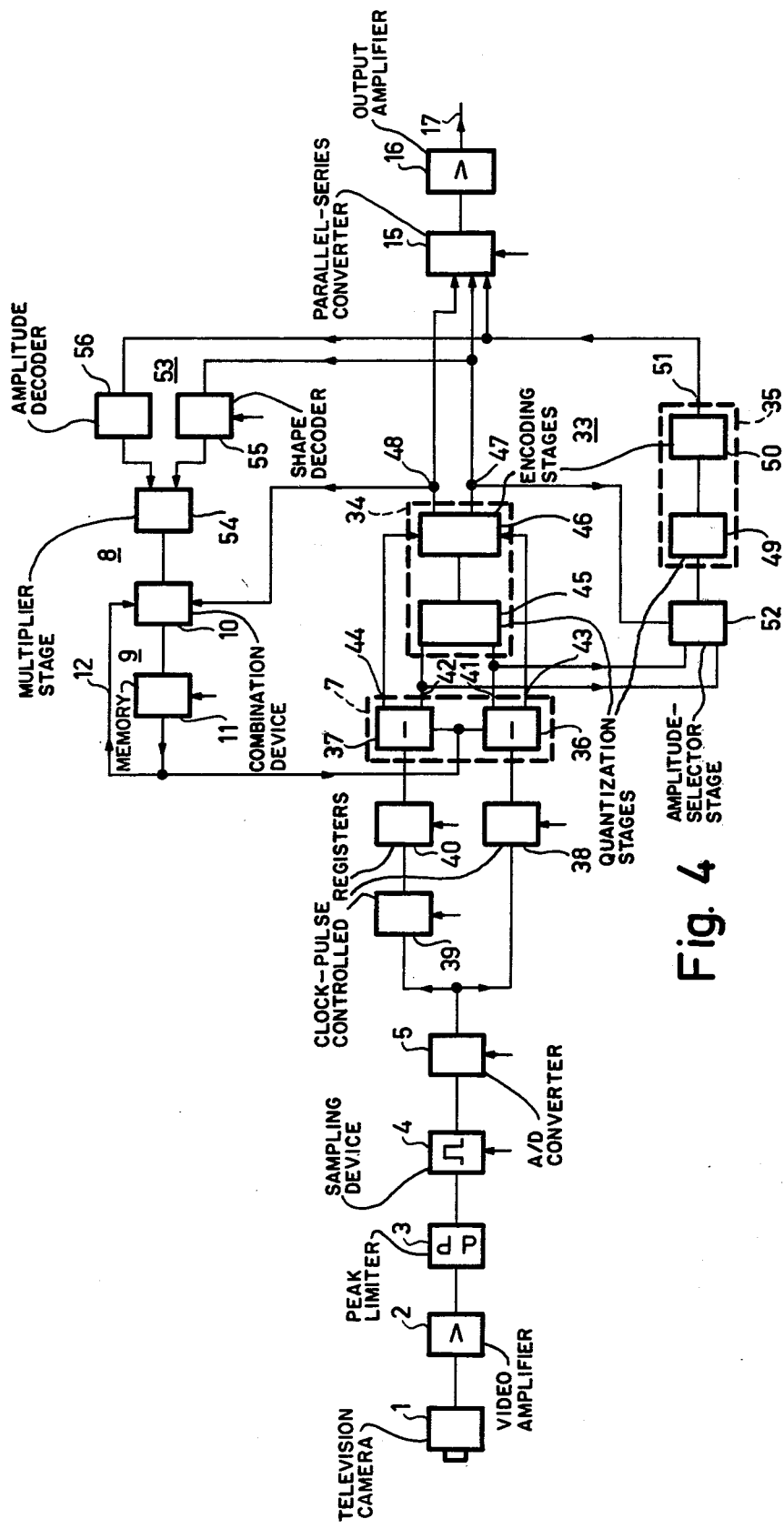

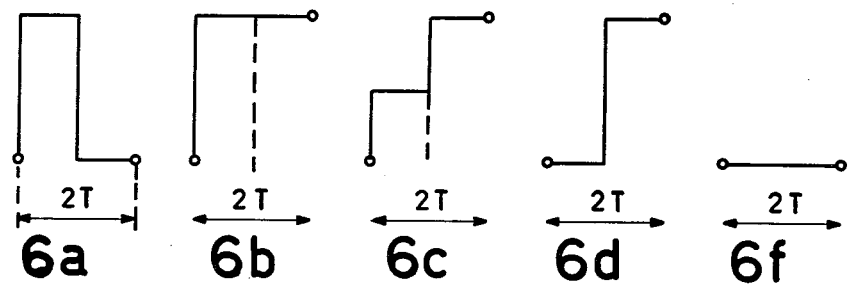
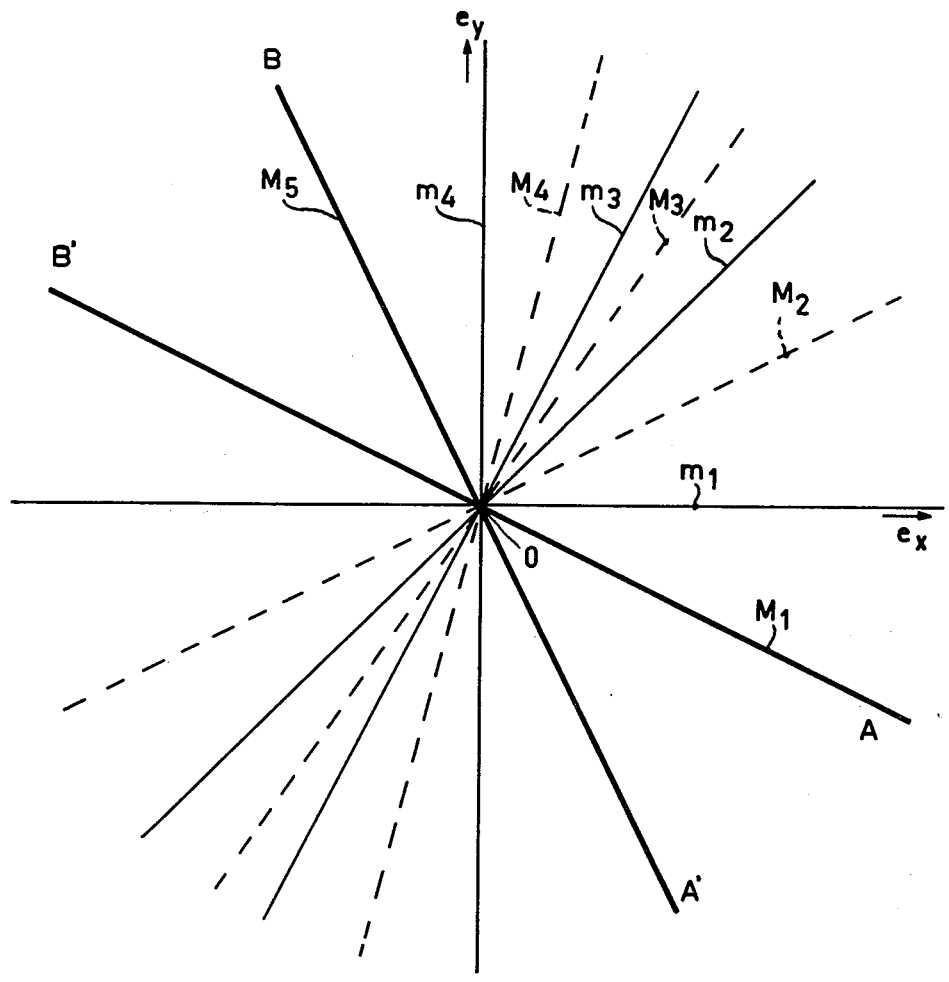
Fig.6e

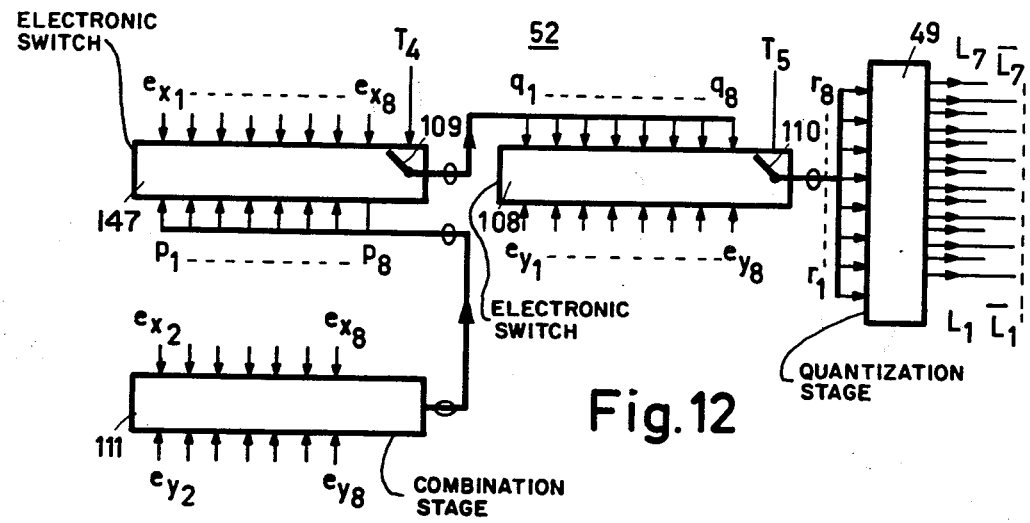
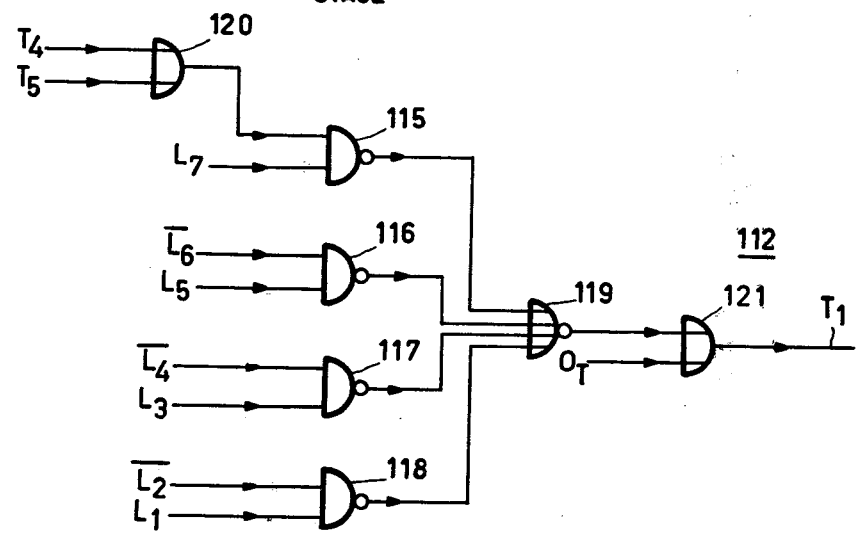
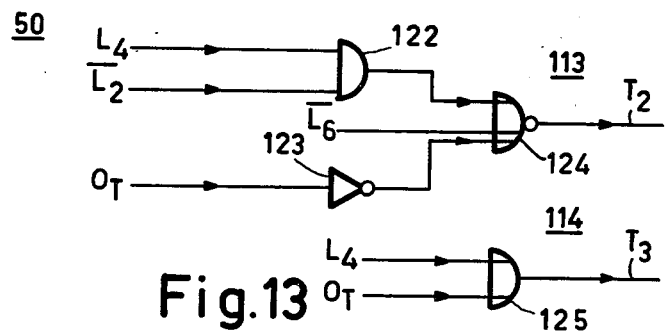
Fig. 12
Fig. 13

MINIMUM GROUP PULSE CODE MODEM HAVING SHAPE AND AMPLITUDE CODES

BACKGROUND OF THE INVENTION

The invention relates to a transmission system for the transmission of signal elements of an information signal which elements are spaced at fixed clock intervals, by means of a pulse code comprising a plurality of pulses, and to transmitters and receivers to be used in said system. The transmitter is provided with a pulse code modulation device, which, before the transmission to the receiver, converts the signal elements applied to a input of said device into the pulse code comprising a plurality of pulses, while the receiver is provided with a pulse code demodulation device, which reproduces the transmitted information signal from the pulse code.

In pulse code modulation the amplitude quantization generally gives rise to deviations between the information signal reproduced by the receiver and the original information signal, which deviations cause so-called quantization noise and adversely affect the reproduction quality. If the number of pulses in the pulse code is increased, the deviations between the reproduced information signal and the original information signal decrease and the reproduction accuracy consequently increases, so that for a signal transmission of satisfactory reproduction quality a comparatively large number of pulses in the pulse code and thus large transmission bandwidths are needed.

In order to reduce the influence of the quantization noise and thus realize a satisfactory reproduction quality using a pulse code with a reduced number of pulses, it is advantageous to employ instantaneous dynamic control, which is characte zed by a non-linear amplitude quantization in the pulse code which is used, in particular so as to effect a substantial reduction of the transmission bandwidth as is inter alia required for image telephony (videophone) transmission. For example, in a known videophone transmission system adapted for the transmission of a videophone signal of 1 MHz bandwidth, employing differential pulse code transmission, a differential pulse code, consisting of only three pulses per signal element situated in 0.5 $\mu$sec clock intervals, was used in order to realize the minimum transmission bandwidth of 3 MHz. However, despite the use of the non-linear amplitude quantization, it was found that at this transmission bandwidth, which had been reduced to the minimum value, the reproduction quality in the transmission system was still found to be particularly unfavourable.

SUMMARY OF THE INVENTION

It is an object of the invention to provide an entirely new concept for a transmission system for transmitters and receivers to be used in said system, the required reproduction quality in combination with simplicity of design, being obtained by a far more efficient use of the number of pulses in a pulse code or, in other words, of the available transmission bandwidth.

The transmission system in accordance with the invention is characterized in that, on the transmission side, the pulse code modulation device takes the form of a minimum-group pulse code modulator for the pulse code conversion of adjoining minimum groups of two signal elements of the information signal. Said minimum group pulse code modulator comprising a shape encoder, which in each group interval encodes by a pulse code a common shape of the normalized amplitude of the signal variation of the two signal elements at the input of the minimum group pulse code modulator, and furthermore comprising an amplitude encoder which in each group inteval encodes an associated amplitude value by a pulse code, the pulse codes generated by the shape encoder and by the amplitude encoder in each group interval being jointly transmitted as a composite pulse code, while in the receiver, for the reproduction of the transmitted information signal, the composite pulse code is applied to a pulse code demodulation device, in the form of a minimum-group pulse code demodulator for the adjoining minimum groups of two signal elements said have been transmitted in pulse code, which minimum-group pulse code demodulator for this purpose comprises a multiplier stage for multiplying the normalized-amplitude shape which has been transmitted in pulse code, in each group interval, by the associated amplitude value.

DESCRIPTION OF THE DRAWINGS

The invention and its advantages wll now be described in more detail with reference to the Figures.

FIG. 4 and FIG. 5 are block diagrams of a transmitter and a receiver in a transmission system of the differential pulse code modulation type in accordance with the invention, while FIG. 6 and FIG. 7 show some diagrams in explanation of the transmission system in accordance with the invention;

FIG. 10–FIG. 14 show some components in the receiver and the transmitter in accordance with FIGS. 8 and 9 in more detail.

DESCRIPTION OF THE PREFERRED EMBODIMENT

Figure 1:
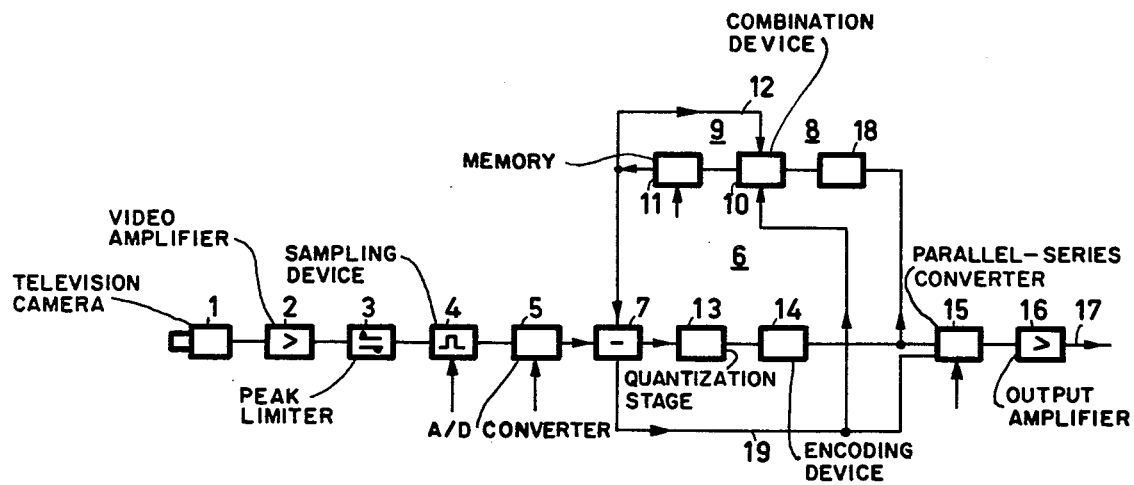
FIG. 1 and FIG. 2 are block diagrams of a transmitter and a receiver in a known transmission system for differential pulse code modulation.

The known transmitter shown in FIG. 1 is adapted for the transmission of videophone signals of 1 MHz bandwidth by means of a pulse code, which comprises a plurality of pulses, in the form of differential pulse code modulation. The unipolar television signals of, for example, positive polarity obtained from a television camera 1, is applied to an analog-to-digital converter 5 with parallel pulse outputs via a sampling device 4, after amplification in a video amplifier 2 and limitation in a peak limiter 3. In the rhythm of, a clock frequency of for example, 2 MHz, signal elements are derived from the sampling device 4, which elements are converted in the analog-to-digital converter 5 into a parallel pulse code for further processing in a differential pulse code modulator 6.

Similarly to the analog-to-digital converter 5, the differential pulse code modulator 6 is of the digital parallel type and comprises a difference producer 7 and a comparison circuit 8, which takes the form of a local differential pulse code demodulator, which includes a digital integrator 9, provided with a combination device 10 followed by a memory 11, whose output is connected to an input of the combination device 10 via a feedback circuit 12 and to an input of the difference producer 7. The difference producer 7 is followed by a quantization stage 13, comprising a plurality of comparators with amplitude levels divided over a non-linear quantization scale, so as to reduce the number of quantization levels, and an encoding device 14, comprising selection gates, which device reduces the number of pulses in the pulse code in conformity with the reduced number of quantization levels of the quantization stage 13.

The output signal of the encoding device 14 is applied to an output line 17 via a parallel-series converter 15 and an output amplifier 16, and to the combination device 10 of the digital integrator 9 via a decoding device 18, which also comprises selection gates and has an inverse decoding characteristic. Moreover, depending on the polarity of the difference signal formed in the difference producer 7, a polarity pulse is produced with the aid of a polarity detector in the difference producer 7, which pulse is also applied via a polarity line 19 to the parallel series converter 15 and to the combination device 10 of the digital integrator 9.

If, in this device, the positive output signal at the output of the analog-to-digital converter 5 is represented by X and the output signal of the digital integrator 9 by $S_{ox}$, the difference producer 7 derives both the magnitude $|e_x| = |X - S_{ox}|$ and the polarity $S(e_x)$ from the difference signal $e_x = X - S_{ox}$, which signal serves as the input signal of the pulse code modulator 6. While the signal $|e_x| = |X - S_{ox}|$, after being processed in the quantization stage 13 and the encoding device 14, is applied to the parallel-series converter 15 and moreover, via the decoding device 18, to the digital integrator 9, the polarity signal $S(e_x)$ is applied directly to said elements 15, 9 via the polarity line 19. In the resulting loop of the differential pulse code modulator, 6 comprising the difference producer 7, quantization stage 13, encoding device 14, decoding device 18, digital integrator 9, and again the difference producer 7, the output signal $S_{ox}$ of the digital integrator 9 follows the positive television signal X on the output of the analog-to-digital converter 5. If for example the positive television signal X on the output of the analog-to-digital converter 5 increases, the output signal $S_{ox}$ of the integrator 9 will also increase, whereas upon a decrease of the television signal X, the integrator 9 output signal $S_{ox}$ will also decrease.

Simultaneous with the transmitted pulses of the pulse code, a synchronisation signal is transmitted via the output amplifier 16, which synchronisation signal is derived from a control pulse generator, not shown, which supplies the clock pulses for the sampling device 4, as well as the control pulses for the analog-to-digital converter 5, the integrator 9, and the parallel-series converter 15, as is indicated in the Figure by the arrows near said elements 4, 5, 9, 15.

Figure 2:
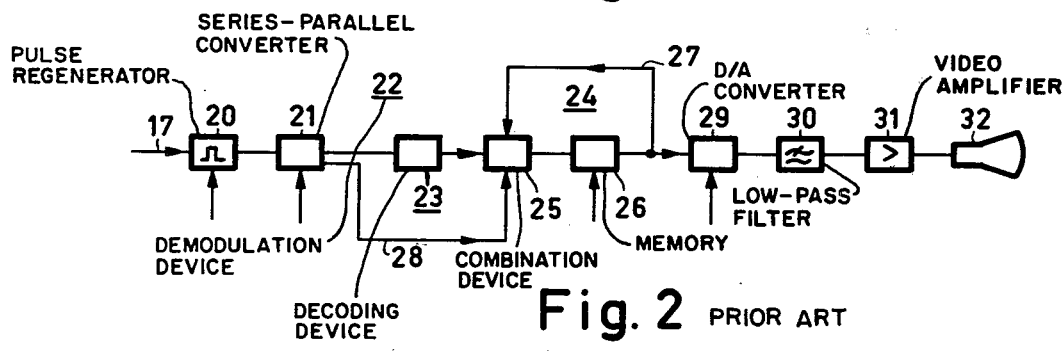

FIG. 2 shows the receiver which co-operates with the transmitter in FIG. 1. After pulse regeneration in a pulse regenerator 20 and series-parallel conversion in a series-parallel converter 21 the pulses of the pulse code, which have arrived via line 17, are applied to a pulse code demodulation device 22 which is in the form of a differential pulse-code demodulator. The pulse code demodulation device 22 is of exactly the same design as the local differential pulse code demodulator 8 on the transmission side and comprises a decoding device 23 followed by a digital integrator 24, which is provided with a combination device 25, a memory 26 and a feedback circuit 27. The differential pulse-code demodulator 22 is also provided with a polarity line 28 connected to the series-parallel converter 21. The line 28, in a similar way as in the local differential pulse-code demodulator 6 on the transmission side, is connected to the combination device 25 of the digital integrator 24.

Thus, the reproduced television signals, $S_{ox}$, are obtained on the output of the digital integrator 24, which, via a digital-to-analog converter 29, are then applied to a low-pass filter 30, which transfers the desired television signals and rejects higher frequencies. After amplification in a video amplifier 31 the television signals, which have been transmitted by differential pulse code modulation, are displayed on a display tube 32.

Similarly to the transmitter in FIG. 1, the receiver shown in FIG. 2 comprises a central control-pulse generator, not shown, which is synchronised by the transmitted synchronisation signal, for generating the control pulses for the pulse regenerator 20, the series-parallel converter 21, the memory 26 of the digital integrator 24, and the digital-to-analog converter 29. Again, the arrows in FIG. 2 indicate that the elements 20, 21, 26, 29 are controlled by the central control-pulse generator.

The reproduction quality of the relevant known videophone transmission system will now be discussed in more detail with reference to the time diagrams shown in FIG. 3. The 1-MHz television signal, after sampling with the 2-MHz clock frequency so as to realize the minimum transmission bandwidth of 3 MHz, is transmitted by a 3-pulse differential pulse code. At a maximum black level of 100 E of the television signal, wherein E is the quantization step, the polarity is characterized by one of the 3 pulses forming the differential pulse code and the signal levels E, 2E, 4E and 8E by the remaining pulses in the pulse code. In the time diagrams of FIG. 3 the quantization step unit E is taken as the unit of black level of the television signal, and the duration T of the limiting clock-time intervals of the consecutive signal elements as the unit of time.

Figure 3A:
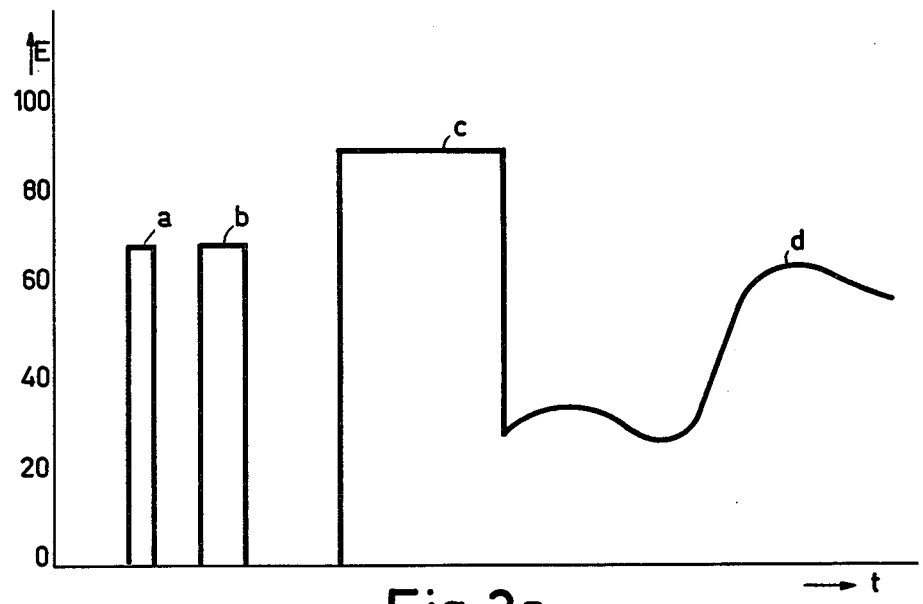
FIG. 3 shows some time diagrams to illustrate the realized reproduction quality.

As an example, the time diagram in FIG. 3a shows a television signal to be transmitted. The reference letters a and b designate black-level lines in reference to the white level with the very short time durations T and 2T, respectively, for example, representing figures and writing in document transmission. The black-level lines a, b of the document transmission are then followed by a black-level block c having a duration of 7T, which changes to a gradually varying grey level d.

Figure 3B:
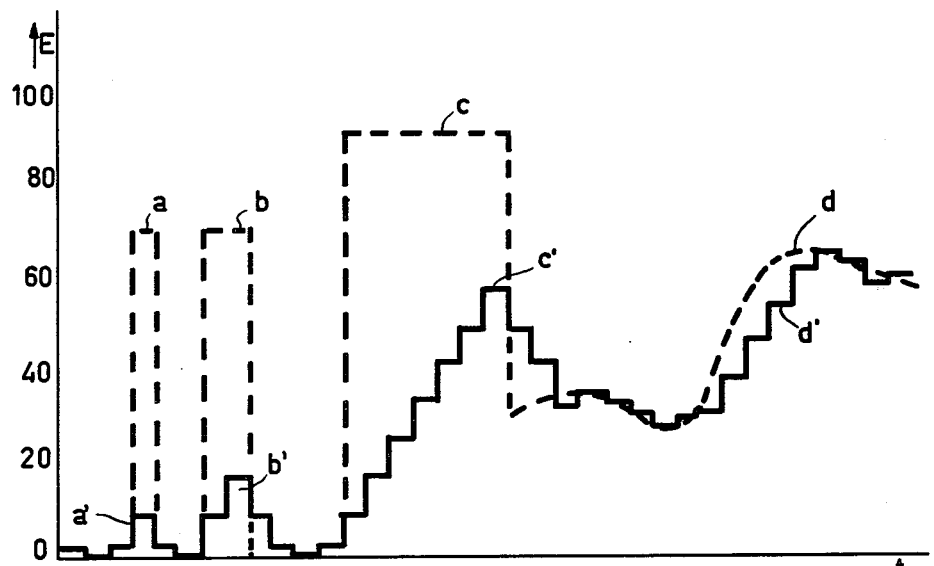

FIG. 3b shows the output signal of the differential pulse code demodulator 22 in the receiver of FIG. 2, in the case of transmission of the television signal shown in FIG. 3a by means of the 3-pulse code. Upon the occurrence of the black-level lines a, b and the black-level block c, during the corresponding time interval, the output signal of the differential pulse code demodulator 22 will each time increase by the maximum signal level of 8E in each clock pulse interval T and will subsequently decrease by said signal level of 8E until respectively the white level is reached or after the black-level block c reaches the grey level d, after which the output signal of the differential pulse-code demodulator 22 will oscillate about the white level and the grey level d with smaller values of the signal levels, in the rhythm of the clock frequency.

At the output of the differential pulse-code demodulator 22, the reproduced approximation a', b', c', d' of the television signal a, b, c, d of FIG. 3a which is shown dotted in FIG. 3b, is then obtained. Comparison of the reproduced approximation a', b', c', d' and the original television signal a, b, c, d reveals that the reproduction quality of the specified pulse code, with considerably reduced transmission bandwidth, is unfavourable, despite the use of the non-linear quantization levels; i.e. the black level of the black-level lines a, b is insufficient, the density block c is shifted laterally and has blurred contours and the definition in the gradually varying grey level d is reduced.

Figure 5:
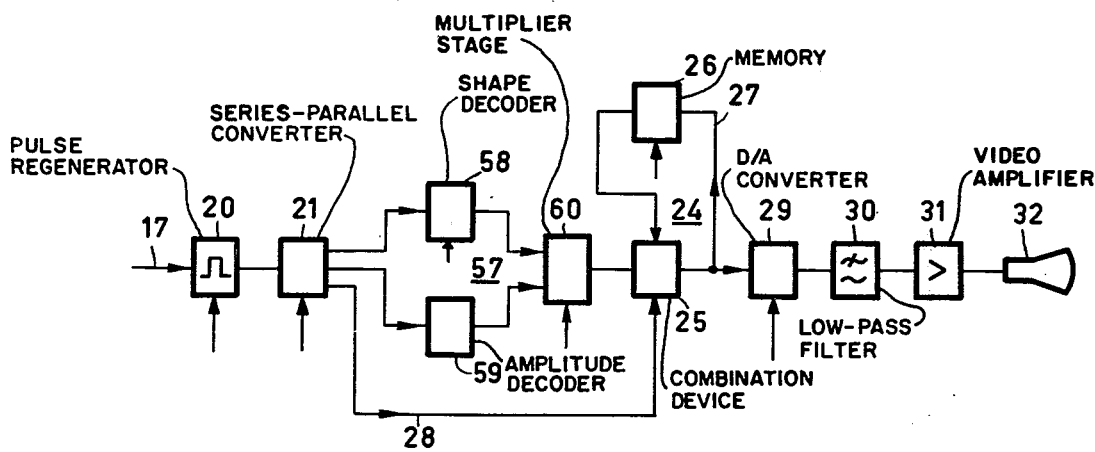

By the use of a novel concept for the pulse code transmission system, which comprises the transmitter shown in the circuit block diagram of FIG. 4 and the receiver shown in FIG. 5, the invention provides a substantial improvement in reproduction quality, in conjunction with simplicity of design by a far more efficient use of the pulses in the pulse code, while the transmission bandwidth remains the same or is reduced. Elements corresponding to those in FIG. 1 and FIG. 2 bear the same reference numerals.

In accordance with the invention, the pulse code modulation device in the transmitter of FIG. 4 takes the form of a minimum-group pulse code modulator 33 for the pulse conversion of adjoining minimum groups of two signal elements of the information signal, comprising a shape encoder 34, which in each group interval encodes by a pulse code a common shape of the normalized amplitude of the signal variation of the two signal elements at the input of the minium group pulse code modulator 33 by a pulse code, and furthermore comprising an amplitude encoder 35 which in each group interval characterizes an associated amplitude value by a pulse code; the pulse codes generated by the shape encoder 34 and by the amplitude encoder 35 in each group interval being jointly transmitted as a composite pulse code.

Similarly to the transmitter in FIG. 1, the transmitter shown in FIG. 4 comprises a difference producer 7 connected to a comparison circuit 8, which difference producer 7, in the present instance, comprises two stages 36, 37 for the formation of the difference between two consecutive digital samples at the output of the analog-to-digital converter 5 and a comparison signal, which samples are simultaneously applied to the two stages 36, 37 of the difference producer 7 by means of clock-pulse controlled registers 38, 39, 40. The two output signals of the analog-to-digital converter 5 are, for example, represented by X, Y and the comparison signal by $S_{oy}$, so that, in the stages 36, 37, the signal elements $e_x = X - S_{oy}$ and $e_y = Y - S_{oy}$ are formed, which are used as input signals for the minimum-group pulse code modulator 33 for further processing in the shape encoder 34 and the amplitude encoder 35. Signals representing the magnitude of the signal elements $|e_x| = X - S_{oy}|$ and $|e_y| = |Y - S_{oy}|$ are available on outputs 41, 42 of the respective stages 36, 37 of the difference producer 7 and the polarity signals $S(e_x)$ and $S(e_y)$ on outputs 43, 44, respectively.

For this purpose, the shape encoder 34 comprises a quantisation stage 45, which receives signals representing the magnitude of the signal elements $|e_x|$ and $|e_y|$, followed by an encoding stage 46, which receives the polarity signals $S(e_x)$, $S(e_y)$, the encoding stage 46 being provided with a pulse-code output 47 and a polarity output 48. The amplitude encoder 35 comprises a non-linear quantisation stage 49 followed by an encoding stage 50 with a pulse-code output 51, while the quantisation stage 49 is preceded by an amplitude-selector stage 52, which receives signals representing the magnitude of the signal elements $|e_w|$, $|e_y|$, and is controlled by the pulse code from the shape encoder 34 for selection of the amplitude value applied to the quantisation stage 49. Thus, pulse codes are derived from the outputs 47, 48 of the shape encoder 34 and the output 51 of the amplitude decoder 35 in each group interval of two clock periods, which pulse codes are respectively characteristic of a normalized-amplitude shape of the signal variation of the two signal elements and of the associated amplitude value. In each group interval of two clock periods, the two pulse codes are transmitted as a composite pulse code.

In comparison with the known transmission system in FIG. 1 and FIG. 2 the transmission period for the composite pulse code has been doubled so that, for the same transmission bandwidth, the number of pulses in the composite pulse code may be doubled. For example, if, in the known transmission system for a television signal of 1 MHz bandwidth, a pulse code of three pulses is transmitted in each clock period T of 0.5 μsec, in the transmission system in accordance with the invention using the same transmission bandwidth a composite pulse code with six pulses $T_1$, $T_2$, $T_3$, $T_4$, $T_5$, $T_6$ is transmitted in each group interval 2T of 1-μsec duration. In the present embodiment the pulses $T_1$, $T_2$, $T_3$ represent the amplitude value, the pulses $T_4$, $T_5$ the normalized amplitude shape, and the pulse $T_6$ the polarity.

More specifically, the pulses $T_4$, $T_5$ represent four normalised-amplitude shapes, indicated by a, b, c, d in a time diagram in FIG. 6, while in the consecutive clock intervals in a minimum group of two signal elements, the normalization values are 1,0; 1,1; ½,1, and 0,1, respectively, for the shapes in FIGS. 6a, 6b, 6c, 6d, said shapes in FIGS. 6a, 6b, 6d being represented by (0,0); (1,0)÷(0,1) and (1,1) in the pulse code ($T_4$, $T_5$).

The signal shapes shown in FIGS. 6a, 6b, 6c, 6d in this order correspond to the amplitude values $e_x$, $(e_x+e_y)/2$, $e_y$, $e_y$; i.e., for the shapes in FIGS. 6a, 6c, 6d, the maximum amplitude value, and for the shape in FIG. 6b, the average amplitude value of the signal elements occurring in the relevant minimum group. Depending on the appearance of one of the signal shapes shown in FIGS. 6a, 6b, 6c, 6d, the relevant amplitude value is selected in the amplitude selector stage 52 under control of the pulse code ($T_4$, $T_5$) and is encoded in the pulse code ($T_1$, $T_2$, $T_3$) via the quantisation stage 49 and the encoding stage 50 of the amplitude encoder 35, which code represents 8 signal levels E, 2E, 4E, 8E, 16E, 32E, 60E, 90E expressed in the quantisation-step unit E.

For sake of completeness it is to be noted that the polarity pulse $T_6$ represents a negative polarity by a "1" and a positive polarity of a "0".

Thus, if by way of example, at a certain instant the composite pulse code ($T_1$, $T_2$, $T_3$, $T_4$, $T_5$, $T_6$) of the composition (1, 0, 1,0, 1,1) is transmitted, this pulse code characterizes a negative polarity, a normalized-amplitude shape as shown in FIG. 6c, and an associated amplitude value of 32E. Together these signal data unambiguously define the signal variation in the relevant minimum group.

On the one hand, the pulse codes at the outputs 47, 51 of the shape encoder 34 and the amplitude encoder 35, together with the polarity pulse from output 48, are combined for transmission in a parallel-series converter 15, which via an output amplifier 16 is connected to the transmission line 17. On the other hand, the pulse codes thus formed, together with the polarity pulse, are applied to the comparison circuit 8, which comprises a local pulse code demodulation device 53, which in accordance with the invention takes the form of a local minimum-group pulse code demodulator. More specifically, the minimum group pulse code demodulator 53 is provided with a multiplier stage 54 for multiplying the normalized-amplitude shape by the corresponding amplitude value, which values are derived from the respective pulse codes from the outputs 47 and 51 of the shape encoder 34 and the amplitude encoder 35, when the pulse codes are applied to a shape decoder 55 and an amplitude decoder 56, each of which is connected to the multiplier stage 54. Moreover, a digital integrator 9 is connected to the output of the multiplier stage 54 in the comparison circuit 8, which integrator 9 comprises a combination device 10 to which there are connected a memory 11 and a feedback circuit 12, the combination device 10 being controlled by the polarity pulses from the output 48 of the shape encoder 34.

Via the shape decoder 55, under control of clock pulses, one of the normalized-amplitude shapes shown in FIGS. 6a, 6b, 6c, 6d is derived from the pulse code ($T_4$, $T_5$) at the input of the multiplier stage 54 in each group interval of 2 clock periods 2T, and via the amplitude decoder 56, the associated amplitude value is derived from the pulse code ($T_1$, $T_2$, $T_3$), while in each group interval, by the multiplication, a digital reproduction, with respect of to shape and amplitude of the signal variation, is produced at the output of the multiplier stage 54, which, in order to obtain the comparison signal $S_{oy}$, is applied to the digital integrator 9. At the end of each group interval, under control of control pulses of twice the clock period, the comparison signal $S_{oy}$ is taken from the memory 11 of the digital integrator 9, which, for further processing in the minimum-group pulse code modulator 33, as described, is applied to the stages 36, 37 of the difference producer 7.

In a similar way as the transmitter in FIG. 1 this transmitter also comprises a control-pulse generator, not shown, which, for the transmission, supplies a synchronising signal to the output amplifier 16, the clock pulses for the sampling device 4, the analog-to-digital converter 5, the registers 38, 39, 40, the shape encoder 55, as well as the control pulses for the parallel-series converter 15 and for the memory 11 of the digital integrator 9, as are indicated by arrows near the elements 4, 5, 11, 15, 38, 39, 40, 55 in the FIG. 4.

Characteristic of the invention is the minimum group pulse code modulator 33, provided with the shape encoder 34 and the amplitude encoder 35, each comprising the various quantisation stages 45, 49 and the subsequent encoding stages 46, 50 for generating the two pulse codes, which are representative of the normalized-amplitude shape of the signal variation of the two signal elements in a group interval T and of the associated amplitude value. While for amplitude encoding in the amplitude encoder 35 the amplitude value to be transmitted is quantized in the quantisation stage 49 with respect to magnitude in accordance with the non-linear quantisation scale, quantisation of the signal variation of the two signal elements is effected in the quantisation stage 45 of the shape encoder 34 with the group in respect to their ratio $m=e_y/e_x$.

For the four normalized-amplitude shapes in FIGS. 6a-6d of the signal variation of the two signal elements, the following is valid: FIG. 6a, $e_x \neq 0$, $e_y=0$, $m_1=0$; FIG. 6b, $e_x=e_y$, $m_2=1$; FIG. 6c, $e_x=e_y/2$, $m_3=2$; FIG. 6d, $e_x=0$, $e_y \neq 0$, $m_4=\infty$. For the sake of simplicity, the data of the normalized amplitude shapes in FIGS. 6a-6d are given in the following Table.

| Figure | $e_x, e_y$ | $m = e_y/e_x$ | code $T_4, T_5$ |
|---|---|---|---|
| 6a | $e_x \neq 0$ $e_y = 0$ | $m_1 = 0$ | 0,0 |
| 6b | $e_x = e_y$ | $m_2 = 1$ | 1,0 |
| 6c | $e_x = e_y/2$ | $m_3 = 2$ | 0,1 |
| 6d | $e_x = 0$ $e_y \neq 0$ | $m_4 = \infty$ | 1,1 |

FIGS. 6a-6d, represented in the ($e_x$, $e_y$) plane correspond to the straight lines passing through the zero point, whose slopes $m_1$, $m_2$, $m_3$, $m_4$ characterize represent the relevant normalized-amplitude shape of FIGS. 6a, 6b, 6c, 6d, in the manner as is illustrated in FIG. 6e.

In order to determine the associated normalized-amplitude shape for a specific signal variation by the relevant slope value $m=e_y/e_x$, the ($e_x$, $e_y$) plane in FIG. 6e has been divided into sector-shaped quantisation areas by the dashed boundary lines of the decision slopes $M_1$, $M_2$, $M_3$, $M_4$, $M_5$, which in the present example are $-\frac{1}{2}$, $+\frac{1}{2}$, $+1\frac{1}{2}$, $+4$, $-2$, respectively. One of the lines $m_1$, $m_2$, $m_3$, $m_4$ is situated between every two dashed bounding lines $M_1$, $M_2$, $M_3$, $M_4$, $M_5$, which is representative of the normalized-amplitude shape of the signal variation, with a slope value $m=e_y/e_x$ situated between the two boundary decision slopes. For example, if the slope value $m=e_y/e_x$ of the signal variation is situated between $M_1$ and $M_2$, the associated normalized-amplitude shape is represented by FIG. 6a; if the slope value $m=e_y/e_x$ of the signal variation is situated between $M_2$ and $M_3$, FIG. 6b represents the associated normalized-amplitude shape; etc. In the sector-shaped quantisation areas, situated between the bounding lines $M_1$, $M_5$ in the second and fourth quadrant, the slope values $m=e_y/e_x$, which are characteristic of the signal variation, appear only sporadically, so that in the present example, these may be neglected in a first approximation.

Without going into further detail, the realization of the shape encoder 34 is particularly simple: by determining with the aid of four comparators in the quantisation stage 45, between which decision slopes the slope value values $m=e_y/e_x$, in absolute value $\frac{1}{2}$, $1\frac{1}{2}$, 2, 4, is situated with respect to magnitude, and by determining the polarity of the outputs 43, 44 of the difference producer 7 in the encoder stage 46, this can be put into practical form by drawing up logic equations with the aid of circuit algebra in accordance with the customary rules. At the same time the polarity pulse $T_6$ is defined in the encoder stage 46, the area in the ($e_x$, $e_y$) plane (compare FIG. 6e) situated above the heavy lines OA and OB, which coincide with the bounding lines $M_1$, $M_5$ in the fourth and second quadrant, is characterized by the polarity pulse $T_6$ as a positive polarity and the area situated below the heavy lines OA' and OB' as a negative polarity.

The normalized-amplitude shape of the signal variation of the two signal elements in a minimum group is characterized by the ratio $m=e_y/e_x$ only and not by their individual magnitudes. For example, if the values of $e_x$ and $e_y$ are 45E and 90E respectively, FIG. 6c shows in the corresponding normalized-amplitude shape, but the same normalized-amplitude shape of FIG. 6c also corresponds to values $e_x$ and $e_y$ of E and 2E respectively. Thus, each time that the two signal elements of a group appear dynamic compression is effected, with a maximum compression factor over a very wide amplitude range, without distortion effects, which, when the minimum-group pulse-code modulator in accordance with the invention is employed, has the particularly important effect that for realizing the desired reproduction quality, a substantially more effective use of the number of pulses in the transmitted pulse code is achieved, or in other words, of the available transmission bandwidth. In conjunction with the dynamic compression effect, the transmission system in accordance with the invention offers the possibility of freely and independently of each other, adapting the quantisation and coding of the normalized-amplitude shape and of the amplitude in the composite pulse code fully to the signal variation, so that the efficient use of the number of pulses in the transmitted pulse code can be optimized.

FIG. 5 shows the receiver for co-operating with the transmitter of FIG. 4, which receiver in this order comprises a pulse regenerator 20, a series-parallel converter 21 and a minimum-group pulse-code demodulator 57, which is connected to the series-parallel converter 21, and is of the same design as the local minimum-group pulse-code demodulator 53 in the comparison circuit 8 of the transmitter. Specifically, the minimum-group pulse-code demodulator 57 is provided with a shape decoder 58 and an amplitude decoder 59 connected to a multiplier stage 60 followed by a digital integrator 24, which comprises a combination device 25 and a memory 26 which is included in a feedback circuit 27.

Each time that in a group interval of two clock periods 2T a composite pulse code ($T_1$, $T_2$, $T_3$, $T_4$, $T_5$, $T_6$) appears at the output of the series-parallel converter 21, in a similar way as in the local minimum-group pulse-code demodulator 53 on the transmission side, the pulse code ($T_4$, $T_5$) which is characteristic of the normalized-amplitude shape, is applied to the shape decoder 58, and the pulse code ($T_1$, $T_2$, $T_3$), which is characteristic of the associated amplitude value, is applied to the amplitude decoder 59, the signal variation, which has been recovered with respect to form and amplitude in the multiplier stage 60, being applied to the digital integrator 24, which via the polarity line 28 is controlled by polarity pulses $T_6$ taken from the series-parallel converter 21. At the output of the combination device 25 of the digital integrator 24 the reproduced television signal is thus available, which after digital-analog conversion in a digital-analog converter 29 is applied to a display tube 32 for reproduction via a low-pass filter 30 and a video amplifier 31.

In the same way as for the transmitter the arrows indicated that the various elements, i.e. the pulse regenerator 20, the series-parallel converter 21, the shape decoder 58, the memory 26 of the digital integrator 24, and the digital-analog converter 29, are controlled by the central control pulse generator, not shown.

Figure 7:
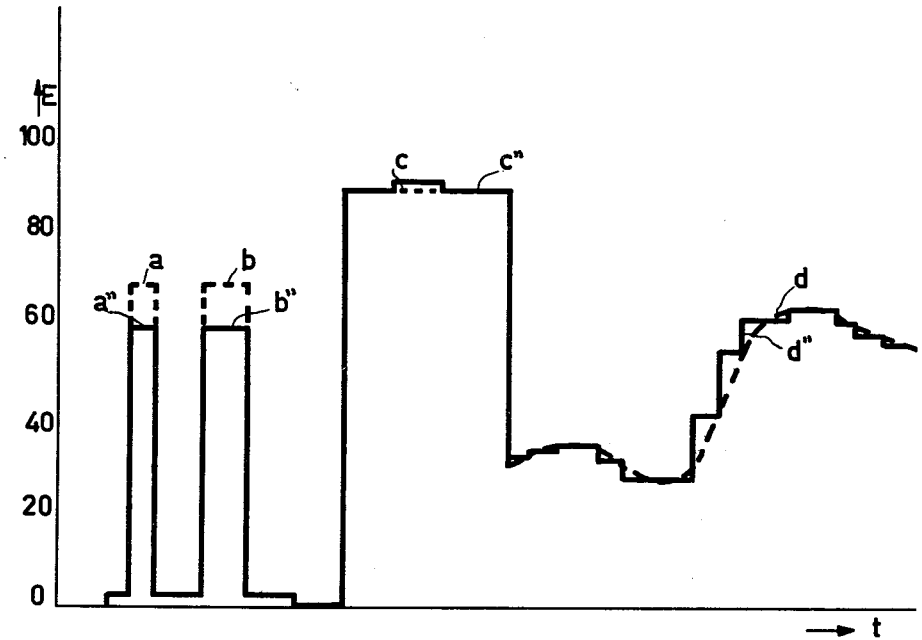

In order to illustrate the significant advance resulting from the use of the minimum-group pulse-code transmission system described hereinbefore, FIG. 7 shows a time diagram. In this Figure the television signal to be transmitted, already illustrated in FIG. 3a, is represented by a b c d, and the corresponding reproduced television signal by a" b" c" d", the original television signal a b c d being shown dotted in FIG. 7, in the same way as in FIG. 3b.

A comparison of the reproduced television signals of FIG. 3b with those of FIG. 7, for which the same transmission bandwidth is used as for the known television transmission system in FIG. 1 and FIG. 2, which employ 3 pulses per signal element, directly shows the substantial technological progress obtained by the far more efficient use of the number of pulses of the pulse code in the minimum-group pulse-code transmission system in accordance with the invention, which combines a dynamic compression with a maximum compression factor in each group interval with an adaptation of the quantisation and coding of the two pulse codes in the composite pulse code to the signal variation. The use of the steps in accordance with the invention not only makes for excellent document reproduction, as is illustrated by the black-level lines a, b and black-level block c, but it is also found that the reproduction quality of the gradually varying television signals is improved substantially. In practice, the transmission quality thus realized corresponds in satisfactory approximation to that of known television transmission systems using 4 pulses per signal element, but which require a 33% larger transmission bandwidth for this purpose.

Figure 9:
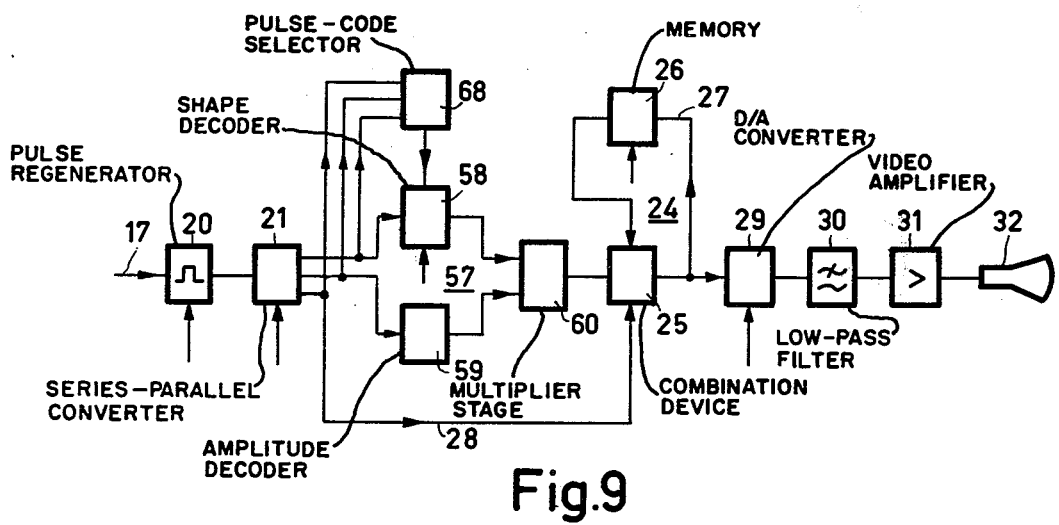
FIG. 8 and FIG. 9 are block diagrams of a transmitter and a receiver in accordance with the invention which have been tested comprehensively in practice.
Figure 8:
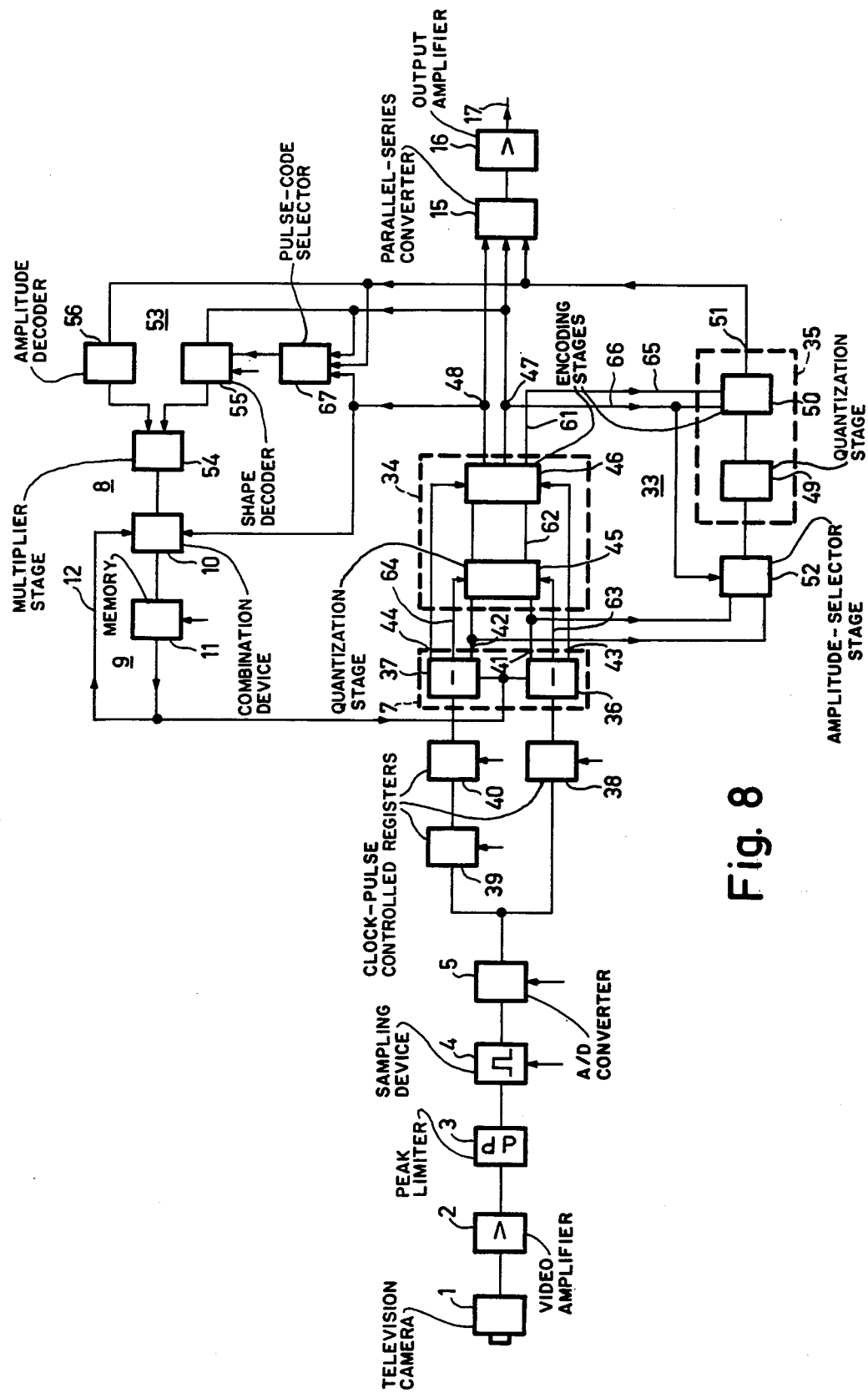

FIG. 8 and FIG. 9 respectively show a transmitter and a receiver of a transmission system in accordance with the invention, which has been tested comprehensively in practice, yielding an improvement of the reproduction quality in comparison with the transmitter of FIG. 4 and the receiver of FIG. 5 by the transmission of a zero signal $O_T$, which is characterized by the normalized-amplitude shape as illustrated in FIG. 6f. Elements corresponding to FIG. 4 and FIG. 5 bear the same reference numerals, while in a similar way as in FIG. 4 and FIG. 5, arrows indicate the various elements controlled by the central control-pulse generator.

In the transmitter of FIG. 8, at the output of the encoder stage 46 of the shape encoder 34, there is provided a separate zero signal output 61 for the transmission of the zero signal $O_T$, which is composed of two components $O_R$ and $O_A$. These are, in particular, a first zero signal $O_R$ when the two components $e_x$, $e_y$ of the difference signal at the two stages 36, 37 of the difference producer 7 are equal to zero, and a second zero signal $O_A$ when the previously mentioned sporadic signal variation occurs, which, when viewed in the quantisation characteristic in FIG. 6e, is situated within the sector-shaped quantisation areas in the second and the fourth quadrant bounded by the bounding lines AOB' and A'OB. More specifically, the first zero signal $O_R$ at the zero signal output 61 of the encoding stage 46 is supplied by the output 62 of a selection gate in the quantisation stage 45, whose inputs are connected to outputs 63, 64 of a zero signal indicator in a form of, for example, a comparator, which is included in each of the stages 36, 37 of the difference producer 7, for determining equality to zero of the components $e_x$, $e_y$ of the difference signal, while the second zero signal $O_A$ is produced in the combination of the quantisation stage 45 and the encoding stage 46 of the shape encoder 34 and is also applied to the zero-signal output 61 of the shape encoder 34.

Each time that the zero signal $O_T$ thus obtained appears at the zero-signal output 61 of the shape encoder 34, the zero signal $O_T$ is transmitted in a zero-signal pulse code specially reserved for this purpose, which is formed by a composite pulse code ($T_1$, $T_2$, $T_3$, $T_4$, $T_5$, $T_6$) corresponding to a sporadically occurring signal variation. Specifically, this is the composite pulse code (1, 1, 1, 0, 0, 0) which is characteristic of the signal variation of the normalized-amplitude shape of positive polarity and maximum magnitude of 90E shown in FIG. 6a.

If the zero signal $O_T$ thus appears on the zero signal output 61 of the shape encoder 34, the shape encoder 34 is set to the pulse code (0, 0, 0) jointly at its code output 47 and its polarity output 48, and the amplitude encoder 35 is set, via a control line 65 connected to the zero-signal output 61, to the pulse code (1, 1, 1), which with the pulse code (0, 0, 0) from the shape encoder 34 then constitutes the pulse code (1, 1, 1, 0, 0, 0) reserved for zero-signal transmission.

Furthermore, since the pulse code (1, 1, 1, 0, 0, 0) has been reserved for the zero signal, transmission of the maximum amplitude value (1, 1, 1) of the normalized amplitude shape (0, 0) is inhibited, which is accomplished by means of a second control line 66, which is connected to the code output 47 of the shape encoder 34, which, in the encoder stage 50 of the amplitude encoder 35, for the normalized-amplitude shape (0, 0), converts its maximum amplitude value (1, 1, 1) to the amplitude value (0, 1, 1) which precedes it with respect to amplitude. In exchange for only one amplitude-quantisation step, in a very rarely occurring signal pattern, transmission of the zero signal is thus accomplished, which, as appears from comprehensive experiments, results in a substantial improvement of the reproduction quality.

The zero signal pulse code is transmitted in an entirely similar manner as the other composite pulse codes, i.e. the zero-signal pulse code (1, 1, 1, 0, 0, 0) is taken from the outputs 47, 48 of the shape encoder 34 and the output 51 of the amplitude encoder 35, and is applied both to the parallel-series converter 15 for the transmission along the transmission line 17 and to the comparison circuit 8, which includes the local pulse-code demodulation device 53 for further processing in the transmitter. The present pulse-code demodulation device 53 differs from that in the transmitter of FIG. 4 by the use of a pulse-code selector 67 for the selection of the zero-signal pulse code (1, 1, 1, 0, 0, 0), whose output is connected to the shape decoder 55 and whose inputs are connected to the outputs 47, 48, 51 of the shape encoder 34 and of the amplitude encoder 50. The pulse-code selector 67 may, for example, be represented simply by a selection gate arrangement.

Each time that the zero-signal pulse code (1, 1, 1, 0, 0, 0) appears, the shape decoder 55 is set to the zero signal, which is characterized by the normalized-amplitude shape shown in FIG. 6f, via the pulse-code selector 67 and, after multiplication, the zero signal is also available at the output of the multiplier stage 54, which signal is applied to the two stages 36, 37 of the difference producer 7 via the digital integrator 9 for further processing in the transmitter in a manner as described hereinbefore. Thus, without increasing the number of composite pulse codes, a fifth normalized-amplitude shape as shown in FIG. 6f is obtained in addition to the four normalized-amplitude shapes shown in FIGS. 6a–6d in exchange for only one amplitude quantisation step of a very sporadically occurring signal pattern which, as is evident from the foregoing, results in a substantial improvement of the reproduction quality.

FIG. 9 shows the receiver co-operating with the transmitter in FIG. 8. Similarly to the local pulse code demodulation device 53 in the comparison circuit 8 of the transmitter in FIG. 8, the receiver, shown in FIG. 9 comprises a pulse-code selector 68, whose output is connected to the shape decoder 58 and to whose inputs the composite pulse codes are applied, which have been taken from the outputs of the series-parallel converter 21. Also in this case, upon each receipt of the zero-signal pulse code, (1, 1, 1, 0, 0, 0) will appear at the output of the multiplier stage 60, which in the manner as described hereinbefore is then applied to the digital-analog converter 29 via the combination device 25, for reproduction in the display tube 32.

Insertion of the zero signal in the reproduction of the television signal results in an additional quantisation being introduced in exchange for one quantisation step at the maximum amplitude of the normalized-amplitude shape in FIG. 6a, which additional quantization is of special advantage for the reproduction of constant levels and gradual level variations which frequently occur in a television signal. For example, in FIG. 7 the white level between the black-level lines a, b and the black-level block c and the black level in the top of the block c will be reproduced without ripple, while the gradual variations in d will be followed in a more satisfactory manner. Therefore, in its totality it is found that, fully in accordance with what was stated in the foregoing, a substantial improvement with respect to reproduction quality has been realized.

For the sake of completeness, the novel circuit elements in the transmitter of FIG. 8 and the receiver of FIG. 9 will now be discussed in more detail. This concerns, in particular, the circuit arrangement of the quantisation stage 45 and the encoder stage 46 in the shape encoder 34, the amplitude selector 52 and the encoding stage 50 in the circuit of the amplitude encoder 35, as well as the shape decoders 55 and 58 respectively, the multiplier stages 54 and 60 respectively, and the pulse-code selectors 67 and 68 respectively in the minimum-group pulse-code demodulators 53 and 57 respectively. The other elements of the transmitter in FIG. 8 and the receiver in FIG. 9 may be designed in the usual manner, for example the difference producer 7, quantisation stage 49 in the amplitude encoder 35, amplitude decoders 56 and 59 in the minimum-group pulse code demodulators 53 and 57 respectively, digital integrator 9 etc.

Figure 10:
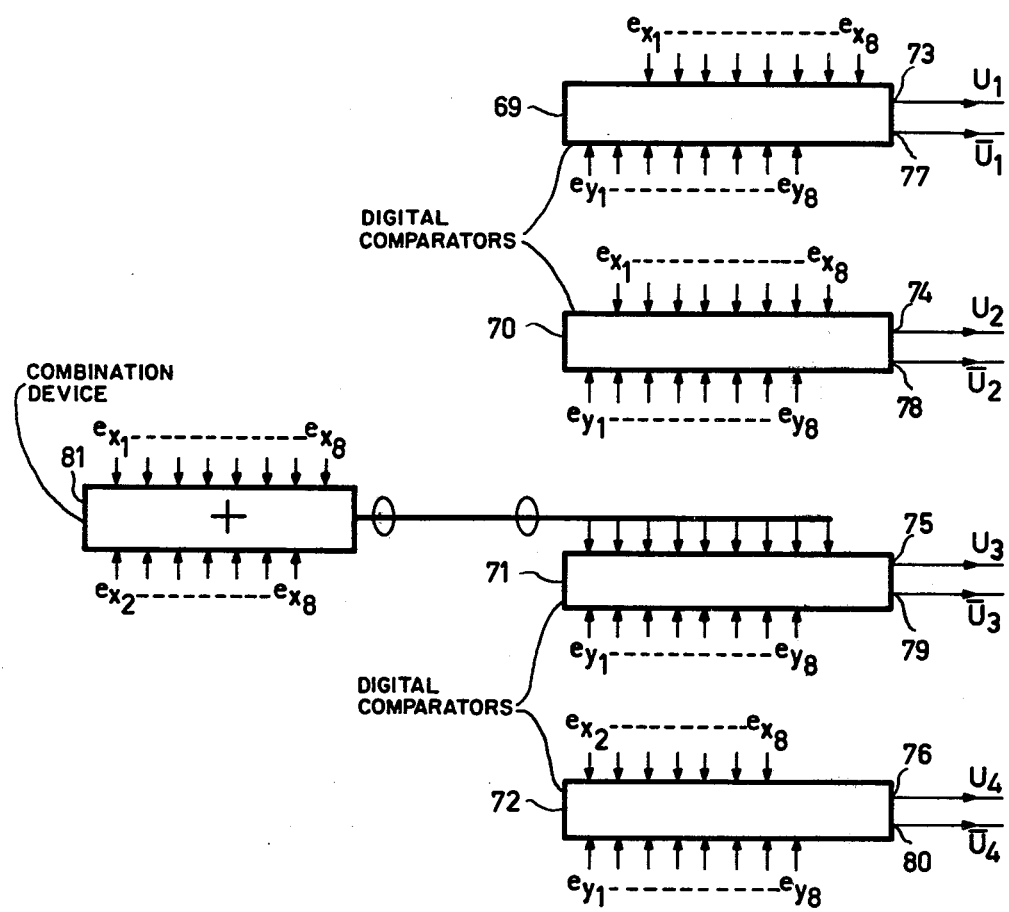

First of all, the quantisation stage 45 in the shape encoder 34 is discussed. In FIG. 10, this stage is provided with digital comparators 69, 70, 71, 72, supplied by the digital signals $|e_x|, |e_y|$ at the outputs 41, 42 of the stages 36, 37 of the difference producer 7, for determining whether the magnitude of the slope $m = |e_y|/|e_x|$ of these signals, in the form of a parallel binary pulse code with, for example, 8 pulses, is greater or smaller than the absolute value of the decision slopes $M_1, M_2, M_3, M_4, M_5, M_6$ shown in FIG. 6e. As stated, the decision slopes $M_1, M_2, M_3$ represent the absolute magnitudes of the four values 4, 2, 1½, ½.

For this purpose the comparators 69, 70, 71, 72, in this order, are therefore adapted for the comparison of the digital signals $|e_y|$ with $4|e_x|$; $|e_y|$ with $2|e_x|$; $|e_y|$ with $1½|e_x|$, and $|e_y|$ with $½|e_x|$, which signals are applied to the parallel inputs $e_{x1}, e_{x2} \ldots ; e_{y1}, e_{y2} \ldots$, of the successive comparators 69, 70, 71, 72. Each time that the digital signals $|e_x|, |e_y|$ appear at the outputs 41, 42 of the stages 36, 37 of the difference producer 7, said amplitude comparisons are performed in the comparators 69, 70, 71, 72, and at their outputs 73, 74, 75, 76 the output signals $U_1, U_2, U_3, U_4$, are obtained, which indicate whether the slope value $m = |e_y|/|e_x|$ is greater or smaller than the absolute value of the decision slopes 4, 2, 1½, ½. Thus the following applies to

| | |
|---|---|
| comparator 69: | $U_1 = 1$ if $m > 4$ |
| | $= 0$ if $m \leq 4$ |
| comparator 70: | $U_2 = 1$ if $m \geq 2$ |
| | $= 0$ if $m < 2$ |
| comparator 71: | $U_3 = 1$ if $m \leq 1\frac{1}{2}$ |
| | $= 0$ if $m > 1\frac{1}{2}$ |
| comparator 72: | $U_4 = 1$ if $m \leq \frac{1}{2}$ |
| | $= 0$ if $m > \frac{1}{2}$. |

For the purpose of coding in the encoding stage 46 the comparators 69, 70, 71, 72 are moreover provided with the outputs 77, 78, 79, 80 which supply the logically inverted signals $\overline{U}_1$, $\overline{U}_2$, $\overline{U}_3$, $\overline{U}_4$.

For the specified values of the decision slopes the quantisation stage 45 is very simple in respect of its design, because the comparison signals $4|e_x|$, $2|e_x|$, $\frac{1}{2}|e_x|$ produced by the comparators 69, 70, 72 can be taken directly from the output of the difference-producing stage 36 using a shift in location. Only the comparator 71 requires the use of a combination device 81 for generating the comparison signal $1\frac{1}{2}|e_x|$ by combination of $|e_x|$ and $\frac{1}{2}|e_x|$.

For the zero-signal transmission the quantisation stage 45 is moreover provided with a selection gate in the form of an AND-gate 82, which is connected to the outputs 63, 64 of the zero-signal indicators in the difference producing stages 36, 37, which gate, when $|e_x|$ and $|e_y|$ are simultaneously zero, supplies a "1" and otherwise a "0" as the zero signal $0_R$.

Figure 11:
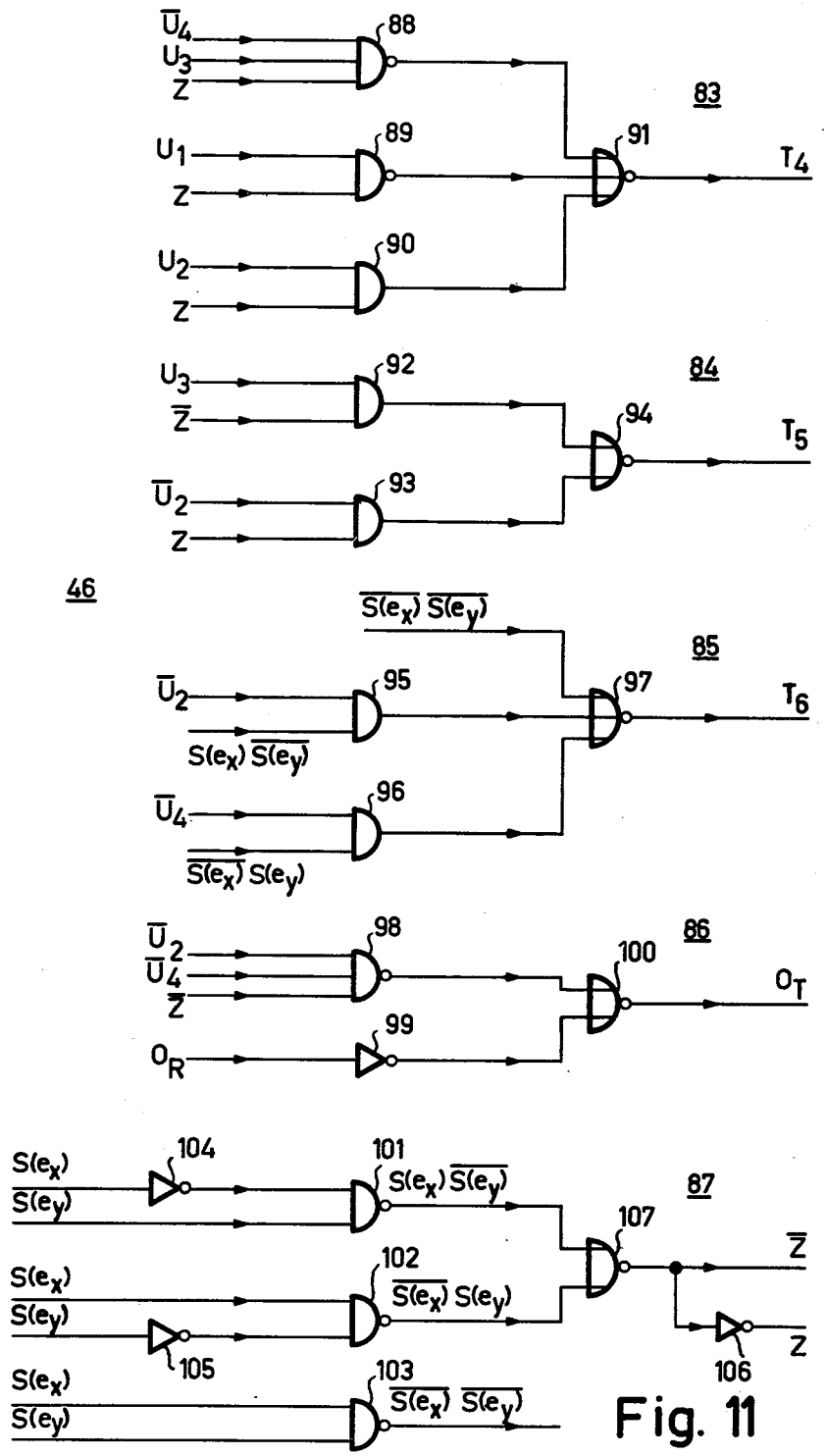

FIG. 11 shows the encoding stage 46 of the shape encoder 34, which from the output signals $U_1$, $U_2$, $U_3$, $U_4$ and $\overline{U}_1$, $\overline{U}_2$, $\overline{U}_3$, $\overline{U}_4$ of the quantisation stage 45, as well as the zero signal $0_R$, utilizing the polarity signals $S(e_x)$, $S(e_y)$ from the outputs 43, 44 of the difference producing stages 36, 37, derives the output signals of the encoding stage 46, which signals, consist of the pulses $T_4$, $T_5$ characteristic of the normalized-amplitude shapes, the pulse $T_6$ for the polarity, and the zero signal $0_T$. Each of the output signals $T_4$, $T_5$, $T_6$ and $0_T$ are generated in the encoding stage 46 in a separate circuit 83, 84, 85, 86 receiving the output signals of the quantisation stage 45 as well as a composite logic polarity signal obtained from a logic polarity generator 87. The input and output signals thereof are designated by letters for the sake of clarity.

For the practical realisation of these circuits 83, 84, 85, 86, logic equations, as follows, are drawn up, after which in the usual manner, the various circuits 83, 84, 85, 86 are designed in accordance with the relevant rules.

Circuit 83: $Z(U_3\overline{U}_4+U_1)+\overline{Z}U_2$
Circuit 84: $Z\overline{U}_3+\overline{Z}U_2$
Circuit 85: $S(e_x)S(e_y)+\overline{S(e_x)}\overline{S(e_y)}U_2+S(e_x)S(e_y)U_4$
Circuit 86: $\overline{Z}\,\overline{U}_2\,\overline{U}_4+O_R$ where $\overline{S(e_x)}$ and $\overline{S(e_y)}$ represent the logic inversions of the polarity signals $S(e_x)$ and $S(e_y)$ and $Z$ and $\overline{Z}$ the composite logic polarity signals:

$$Z = S(e_x)S(e_y)+\overline{S(e_x)}\,\overline{S(e_y)}$$

$$\overline{Z} = \overline{S(e_x)}S(e_y)+S(e_x)\overline{S(e_y)}$$

From the foregoing logic equations the circuit arrangement as shown in the Figure follows for the circuits 83, 84, 85, 86 and the logic polarity generator 87, which respectively comprise:

circuit 83: NAND-gates 88, 89; AND-gate 90; NOR-gate 91
Circuit 84: AND-gates 92, 93; NOR-gate 94
Circuit 85: AND-gates 95, 96; NOR-gate 97
Circuit 86: NAND-gate 98, inverter 99; NOR-gate 100
logic polarity generator 87: NAND-gates 101, 102, 103; inverters 104, 105, 106; NOR-gate 107.

The required composite logic polarity signals for the circuits 83, 84, 85, 86 are specified in the Figure.

As follows from the foregoing description, it is evident that for generating the output signals $T_4$, $T_5$, $T_6$, $0_T$ of the shape encoder 34 in the quantisation stage 45, a quantisation with respect to the absolute values of the decision slopes $M_1$, $M_2$, $M_3$, $M_4$, $M_5$, $M_6$ suffices, which results in a substantial reduction of the number of comparators in the quantisation stage 45.

The circuit arrangement of the amplitude encoder 35 will now be discussed in more detail, which differs in accordance with the amplitude selector stage 52 of FIG. 12 for the selection of the digital signal $|e_x|, |e_y|$ or $|e_x|/2+|e_y|/2$ depending on the shape pulse code $T_4$, $T_5$ as input signal for the quantisation stage 45 and in the design of the encoding stage 46 which zero-signal transmission in FIG. 13.

For example, the amplitude selector stage 52 in FIG. 12 takes the form of two series-connected electronic switches 147, 108 with switching contacts 109, 110 which are each controlled by the code pulses $T_4$, $T_5$. The 8-pulse binary pulse code $|e_x|$ and the pulse code $|e_x|/2+|e_y|/2$ from the combination device 111 are applied to the inputs $e_{x1}$, $e_{x2}$ and $p_1$, $p_2$ ... of the electronic switch 147, while the pulse code $|e_y|$ and the pulse code $|e_x|$ from the switching contact 109 of the electronic switch 147 are respectively applied to inputs $e_{y1}$, $e_{y2}$ ... ; $q_1$, $q_2$ ... of the electronic switch 108. The inputs of the combination device 111, for the combination of the pulse codes $|e_x|/2$ and $|e_y|/2$, are now respectively designated $e_{x2}$, $e_{x3}$ ... and $e_{y2}$, $e_{y3}$.

Depending on the pulse code ($T_4$, $T_5$), the desired digital signal is applied to the inputs $r_1$, $r_2$ ... of the quantisation stage 49 through the switching contact 110 of the electronic switch 108; i.e. for the pulse code ($T_4$, $T_5$) the digital signals $|e_x|, |e_x|/2+|e_y|/2, |e_y|$ and $|e_y|$ given by (0,0), (1,0), (0,1), (1,1) in this order. Thus, the output signals $L_1$, $L_2$, $L_3$, $L_4$, $L_5$, $L_6$, $L_7$ are obtained at the outputs of the quantisation stage 49, which correspond to the decision values of the quantisation stage 49, while for encoding, the quantisation stage 49 is moreover provided with outputs for the logically inverted output signals $\overline{L}_1$, $\overline{L}_2$, $\overline{L}_3$, $\overline{L}_4$, $\overline{L}_5$, $\overline{L}_6$, $\overline{L}_7$.

FIG. 13 shows the encoding stage 50 of the amplitude encoder 35 with zero signal transmission, which encoder stage 50 is provided with three circuits 112, 113, 114 for generating the amplitude pulse-code ($T_1$, $T_2$, $T_3$). The three circuits 112, 113, 114 of the amplitude encoding stage 50 receive the output signals $L_1$, $L_2$, $L_3$, $L_4$, $L_5$, $L_6$, $L_7$ and $\overline{L}_1$, $\overline{L}_2$, $\overline{L}_3$, $\overline{L}_4$, $\overline{L}_5$, $\overline{L}_6$, $\overline{L}_7$ of the quantisation stage 49 as well as the pulse code $T_4$, $T_5$, $0_T$ from the encoding stage 46 of the shape encoder 34. The input and output signals of the circuits 112, 113, 114 are again designated by letters for the sake of clarity.

In a similar way as for the encoding stage 46 of the shape encoder 34, the design of the circuits 112, 113, 114 of the amplitude encoding stage 50 is based on logic equations which in the present instance are as follows for:

the circuit 112: $L_7(T_4+T_5)+L_5\overline{L}_6+L_3\overline{L}_4+L_1\overline{L}_2+0_T$ the circuit 113: $L_2\overline{L_4}+L_6+0_T$
the circuit 114: $L_4+0_T$.

Using the appropriate rules these equations lead to a circuit arrangement as shown in FIG. 13 for the three circuits 112, 113, 114 of the encoding stage 50 of the amplitude encoder 35, which circuits respectively comprise:

Circuit 112: NAND-gates 115, 116, 117, 118; NOR-gate 119; OR-gates 120, 121
Circuit 113: AND-gate 122; inverter 123; NOR-gate 124
Circuit 114: OR-gate 125.

Thus the composite pulse code ($T_1$, $T_2$, $T_3$, $T_4$, $T_5$, $T_6$) is then obtained at the output circuits of the shape encoder 34 and the amplitude encoder 35, which code, for further processing in the transmitter and recovery of the transmitted signal in the receiver, is applied to the respective minimum-group pulse demodulators 53 and 57 included therein. The minimum-group pulse code demodulator 57 in the receiver of FIG. 9 will now be discussed in more detail with reference to FIG. 14; the minimum-group pulse-code demodulator 53 in the transmitter in FIG. 8 being of exactly the same design.

Figure 14:
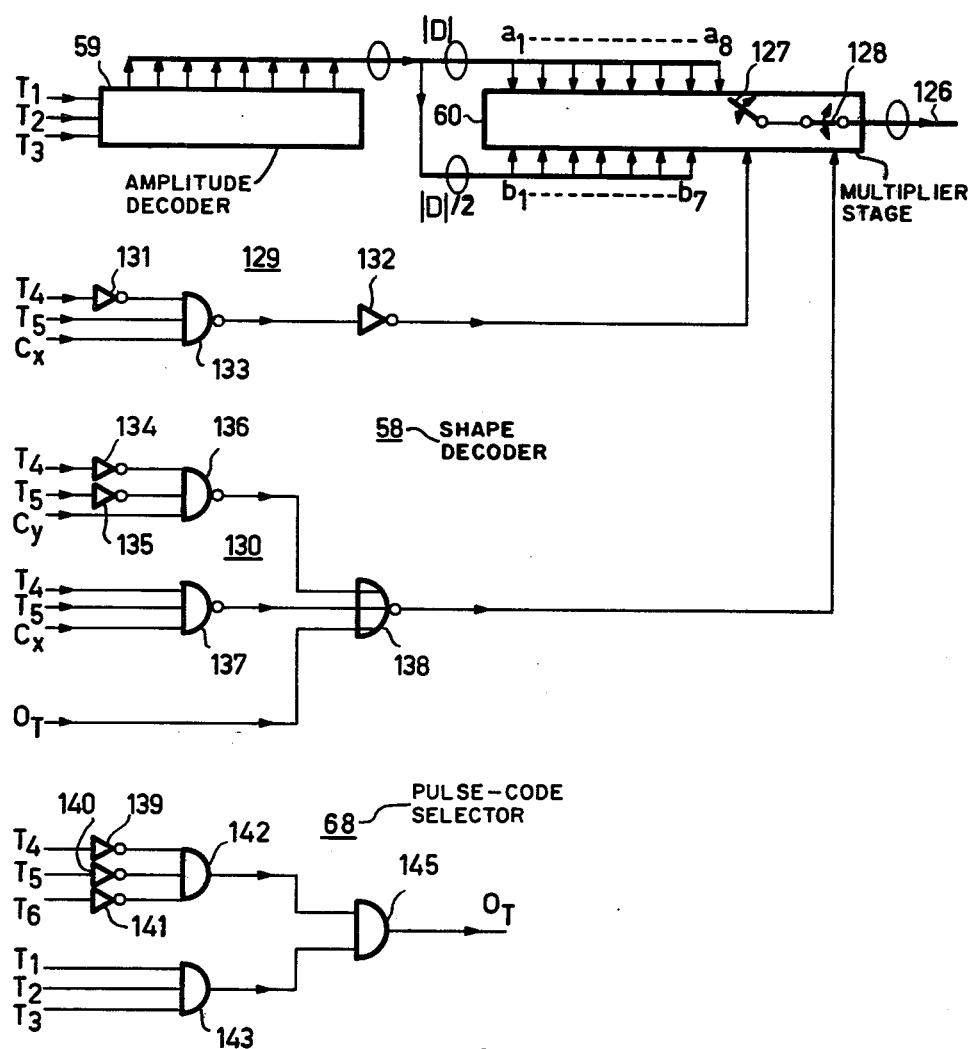

As was stated with reference to FIG. 14 the minimum-group pulse-code demodulator 57 is provided with an amplitude decoder 59 a shape decoder 58, controlled by clock pulses, and connected thereto a code selector 68 and a multiplier stage 60. The amplitude decoder 59, for the conversion of the amplitude pulse-code ($T_1$, $T_2$, $T_3$) into the 8-pulse binary pulse code D, is of customary design, for which reason said device is represented by a block diagram in FIG. 14.

In the present version, the multiplier stage 60 is represented by an electronic switch, having inputs $a_1, a_2 \ldots$; $b_1, b_2 \ldots$, which respectively receive the digital signals $|D|$ and $|D|/2$, obtained from the amplitude decoder 59, as well as two switching contacts 127, 128 which are included in the output 126 of the multiplier stage 60, which contacts are controlled in the rhythm of the clock period by pulses from the shape encoder 58, which pulses are characteristic of the normalized-amplitude shape. If the first clock pulse in each group interval is designated $C_x$ and the second clock pulse $C_y$, the output signals of the multiplier stage 60, for the various normalized-amplitude shapes in FIG. 6, are then respectively: zero for FIG. 6f during $C_x$ in FIG. 6d, and during $C_y$ in FIG. 6a; $|D|/2$ during $C_x$ in FIG. 6c; $|D|$ in all other cases.

In this version of the multiplier stage 60, the shape decoder 58 is represented by two circuits 129, 130 for controlling the switching contacts 127, 128. The circuit 129 connects the switching contact 127 to inputs $a_1, a_2$ ... for the digital signal $|D|$ in the case of a "1" and to the inputs $b_1, b_2 \ldots$ for the digital signal $|D|/2$ in the case of a "0", while the circuit 130, via the switching contact 128, provides an interconnection in the case of a "0" and an interruption in the case of a "1".

Under these conditions, the following logic equations are valid for the two circuits 129, 130 of the shape decoder 58;
Circuit 129: $C_x\overline{T_4}T_5$
Circuit 130: $C_xT_4T_5+C_y\overline{T_4T_5}+0_T$.
Thus, the two circuits 129 and 130 will have the circuit arrangements shown in the FIG. 14, respectively comprising:
the circuit 129: inverters 131, 132; NAND-gate 133
the circuit 130: inverters 134, 135; NAND-gates 136, 137; NOR-gate 138.

For the pulse-code selector 68 for the selction of the zero signal $0_T$, the logic equation $T_1T_2T_3\overline{T_4T_5T_6}$ is valid, which corresponds to the circuit arrangement shown in the FIG. 14, comprising: inverters 139, 140, 141; AND-gates 142, 143, 145. In a similar way as in the detailed diagrams in the preceding Figures, the input and output signals are also designated by letters in this Figure.

From the foregoing detailed description the very simple design of the transmission system in accordance with the invention by means of conventional digital elements is evident, which system makes particularly efficient use of the number of pulses in the transmitted pulse code, which, owing to its favourable dynamic-compression properties as well as the adaptation to the nature of the transmitted signal, enables an optimum reproduction quality to be obtained at the available transmission bandwidth. In conformity with the variations of the transmitted signal, optimum signal adaptation is ensured by adjustment of the quantisation of the amplitude pulse code and that for the normalized-amplitude shape.

Within the scope of the invention, various embodiments are possible. For example, instead of the selection of the amplitude values $e_x$, $(e_x+e_y)/2$, $e_y$, $e_y$ corresponding to the normalized-amplitude shapes in FIG. 6a, 6b, 6c, 6d in the amplitude selector stage 52, it is alternatively possible to employ the amplitude values $e_x+e_y$, $(e_x+e_y)/2$, $e_x+e_y$, $e_x+e_y$, which results in a simplification of the amplitude selector stage 52 and an enhanced contrast effect. On the other hand, it is possible to substantially simplify the comparator circuit 8 in the transmitter for, because in the comparison circuit 8 the comparison signal $S_{oy}$ is only required every second clock period $C_y$, only the demodulated signal in said second clock period $C_y$ should be known, which implies the aforementioned simplification. Thus, in the device in accordance with FIG. 14, only one switching contact, which serves for transferring or interrupting the signal, need be included in the output of the amplitude decoder 59, which contact is controlled in accordance with the output signal of the circuits 134, 135, 136 as well as the zero signal $0_T$, so that in this way all further components in the pulse-code demodulator shown may be dispensed with, i.e. the electronic switch 60 with switching contacts 127, 128, the circuit 129 in the shape decoder 58 with inverters 131, 132 and NAND-gate 133, as well as the circuit with NAND-gate 137 in the circuit 130. The various components, such as multiplier stage, quantisation stages, encoding stages may not only be of different design, but the transmission system in accordance with the invention is particularly suitable for construction in different technologies, such as, for example, by means of digital elements, solid state integration, the use of microprocessors, etc.

What is claimed is:

1. A transmission system for the transmission of signal elements of an information signal, which elements are spaced at fixed clock intervals, by means of a pulse code comprising a plurality of pulses, said system comprising a transmitter and a receiver, the transmitter being provided with a pulse code modulation device, which, before the transmission to the receiver, converts the signal elements applied to the input of said device into said pulse code, while the receiver is provided with a pulse code demodulation device which reproduces the transmitted information signal from said pulse code; wherein on the transmission side, the pulse code modulation device takes the form of a minimum-group pulse code modulator, for the pulse code conversion of adjoining minimum groups of two signal elements of the information signal, comprising a shape encoder, which in each group interval encodes a common shape of normalized amplitude of the signal variation of the two signal elements at the input of the minimum group pulse code modulator by a pulse code, and furthermore comprising an amplitude encoder which in each group interval, encodes an associated amplitude value by a pulse code, the pulse codes generated by the shape encoder and by the amplitude encoder in each group interval being jointly transmitted as a composite pulse code, while in the receiver, for the reproduction of the transmitted information signal, the composite pulse code being applied to a pulse code demodulation device, in the form of a minimum-group pulse code demodulator for the adjoining minimum groups of two signal elements which have been transmitted in pulse code, which minimum-group pulse code demodulator for this purpose comprises a multiplier stage for multiplying the normalized-amplitude shape, which has been transmitted in pulse code, in each group interval, by the associated amplitude value.

* * * * *